United States Patent
Iwabuchi

(10) Patent No.: US 12,422,573 B2
(45) Date of Patent: Sep. 23, 2025

(54) RADIATION IMAGING APPARATUS, RADIATION IMAGING SYSTEM, AND METHOD FOR CONTROLLING RADIATION IMAGING APPARATUS

(71) Applicant: CANON KABUSHIKI KAISHA, Tokyo (JP)

(72) Inventor: Yuki Iwabuchi, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 298 days.

(21) Appl. No.: 18/356,862

(22) Filed: Jul. 21, 2023

(65) Prior Publication Data
US 2024/0027635 A1    Jan. 25, 2024

(30) Foreign Application Priority Data
Jul. 25, 2022 (JP) ................... 2022-117630

(51) Int. Cl.
*G01T 1/20* (2006.01)
(52) U.S. Cl.
CPC ................. *G01T 1/20182* (2020.05)
(58) Field of Classification Search
CPC ....... G01T 1/20182; H04N 25/63; H04N 5/32
See application file for complete search history.

(56) References Cited

U.S. PATENT DOCUMENTS

| | | | | |
|---|---|---|---|---|
| 2021/0141105 | A1* | 5/2021 | Ofuji | H04N 25/617 |
| 2022/0334272 | A1* | 10/2022 | Okada | H04N 25/63 |
| 2022/0365232 | A1* | 11/2022 | Bannai | H04N 23/30 |

FOREIGN PATENT DOCUMENTS

JP    2011249891 A    12/2011

* cited by examiner

*Primary Examiner* — Edwin C Gunberg
*Assistant Examiner* — Richard O Toohey
(74) *Attorney, Agent, or Firm* — Canon U.S.A., Inc. IP Division

(57) ABSTRACT

A radiation imaging apparatus includes a radiation detector and one or more controllers being configured to acquire first output information and then acquire second output information being information about a charge accumulated in a plurality of pixels without radiation irradiation on the radiation detector, the first output information being information about the charge accumulated in the plurality of pixels with radiation irradiation on the radiation detector, wherein the first output information and the second output information are information for acquiring a corrected radiation image, and wherein an output value of a predetermined row that is included in the first output information is an output value of the charge accumulated over a first period, and an output value of the predetermined row that is included in the second output information is an output value of the charge accumulated over a second period, the second period being longer than the first period.

20 Claims, 8 Drawing Sheets

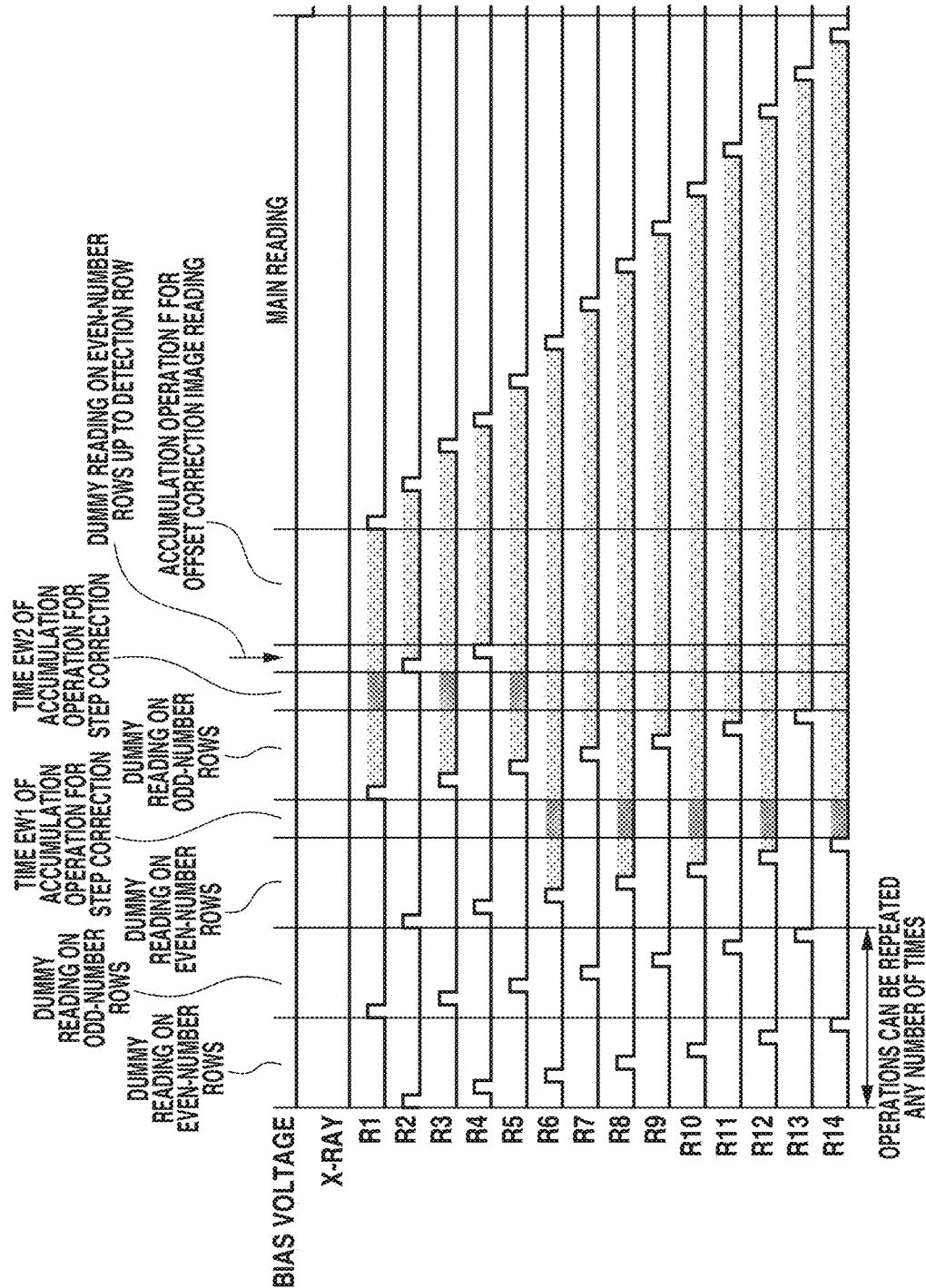

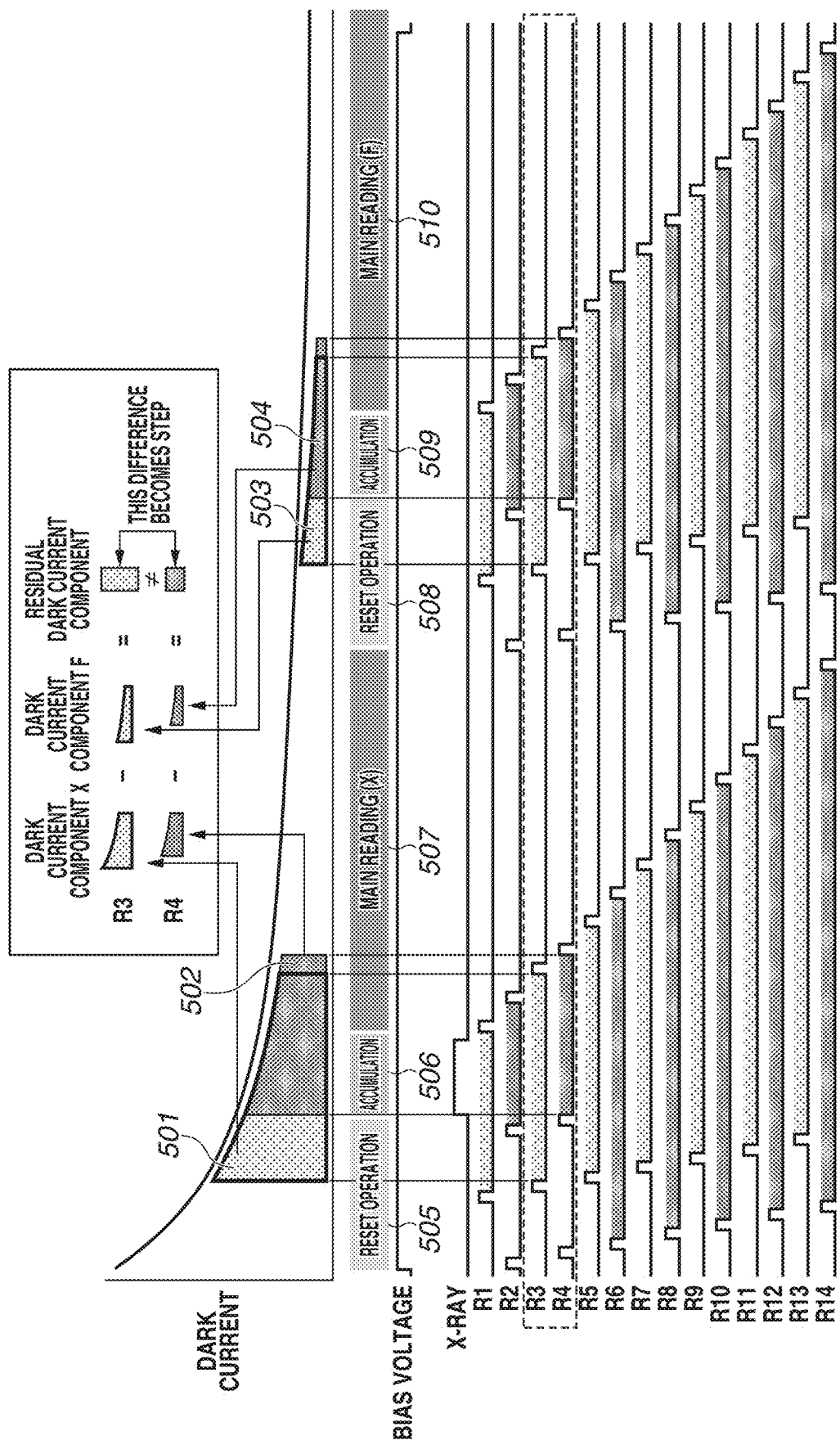

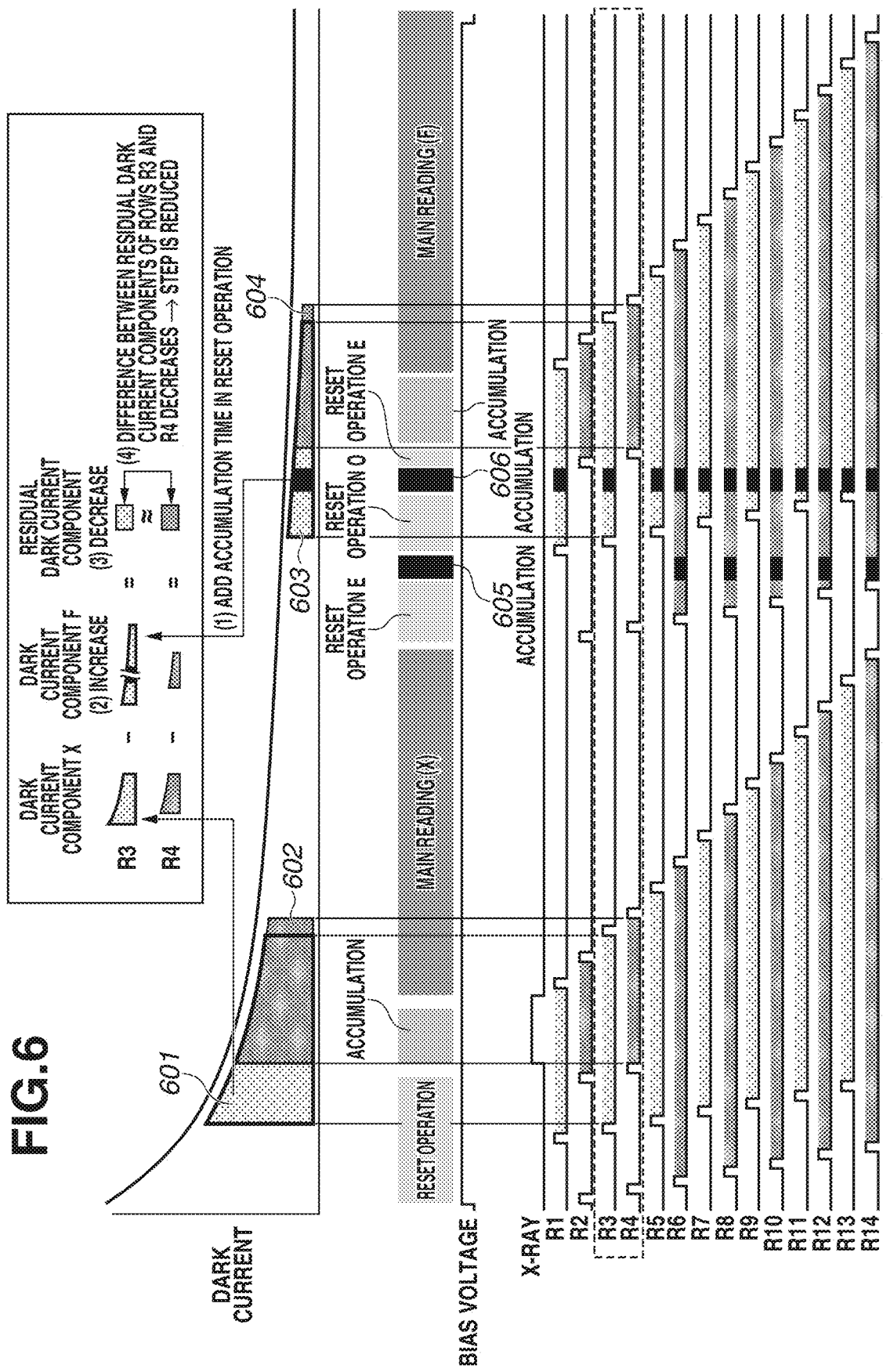

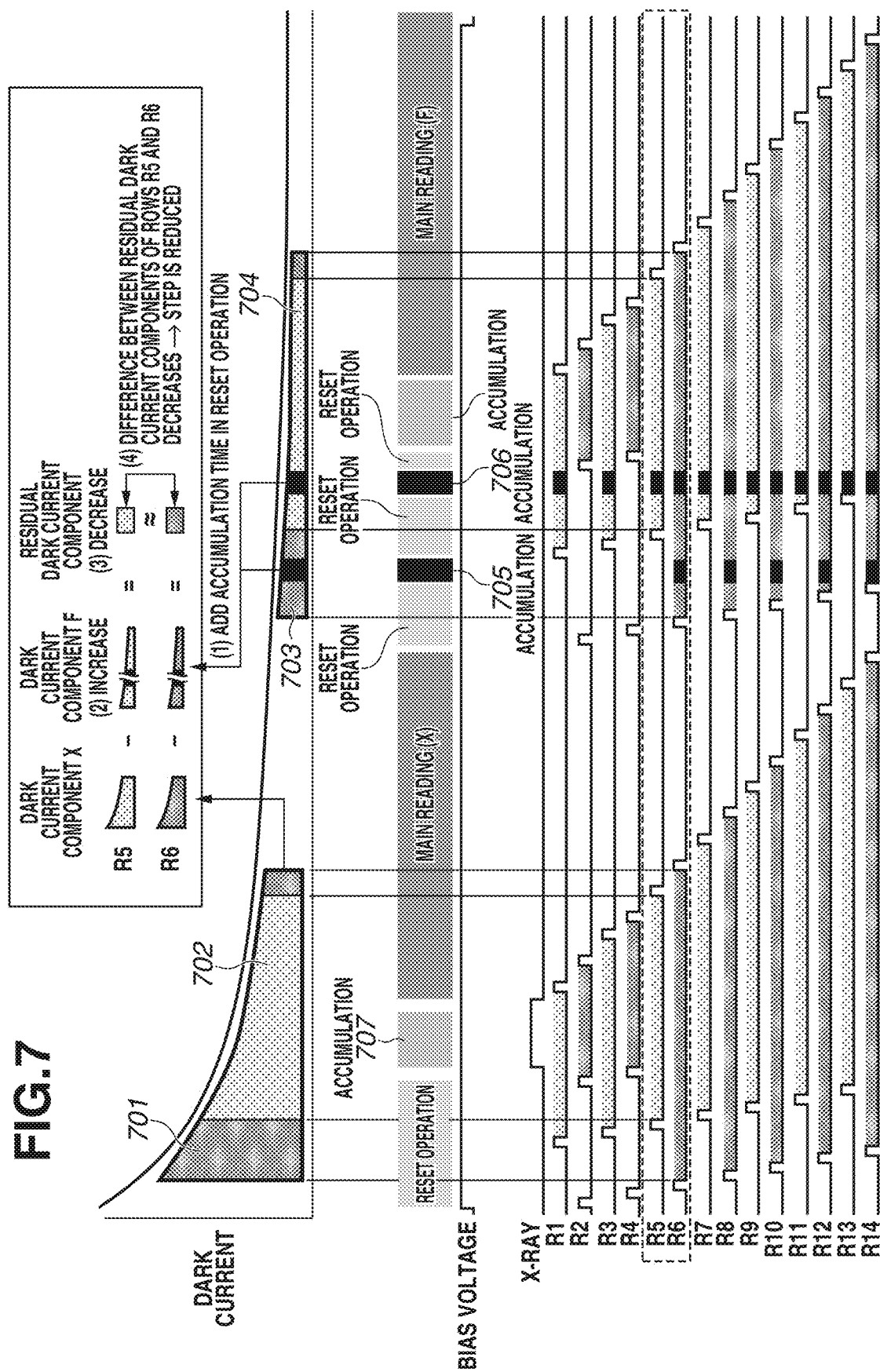

RADIATION IMAGING APPARATUS, RADIATION IMAGING SYSTEM, AND METHOD FOR CONTROLLING RADIATION IMAGING APPARATUS

BACKGROUND OF THE DISCLOSURE

Field of the Disclosure

The present disclosure relates to a radiation imaging apparatus, a radiation imaging system, and a method for controlling the radiation imaging apparatus.

Description of the Related Art

A radiation imaging apparatus that uses a flat panel detector (hereinafter, referred to as "FPD"), formed using a semiconductor material, is widely used now as an imaging apparatus for use in medical image diagnoses and non-destructive examinations using X-rays. In the medical image diagnoses, for example, the radiation imaging apparatus is used as a digital imaging apparatus for capturing still images as in general imaging and capturing moving images as in fluoroscopy imaging. The imaging apparatus is generally configured so that an X-ray generation apparatus is synchronized with the FPD, and thus the FPD and the X-ray generation apparatus need to be connected together. This gives rise to an issue that installation locations are limited.

In relation to the issue, Japanese Patent Application Laid-Open No. 2011-249891 discusses a technique for detecting a start of radiation irradiation based on a current flowing in a bias line connected with pixels of a FPD without synchronizing an X-ray generation apparatus with the FPD. Specifically, a reset operation is performed in which the pixels are sequentially scanned, and in a case where the radiation irradiation is detected, the reset operation is stopped, and an accumulation operation is started. When the radiation irradiation is ended, the pixels are sequentially scanned, and an image data reading operation is performed.

Further, Japanese Patent Application Laid-Open No. 2011-249891 discusses a technique for reading offset correction data, after the image data reading operation, by performing the operations from the reset operation to the reading operation in the same way in a state without the radiation irradiation.

The present inventors have found an issue of the techniques discussed in Japanese Patent Application Laid-Open No. 2011-249891. Specifically, in a case where dark current components of conversion elements change over time, the techniques discussed in Japanese Patent Application Laid-Open No. 2011-249891 may not correct step-shaped artifacts generated in rows before and after a row where radiation is detected, and image quality may decrease. Step-shaped artifacts may appear more prominently especially in a case where the reset operation is performed using a method referred to as interlaced scan in which rows that are not adjacent to each other in the scan direction, e.g., even-number rows and odd-number rows, are scanned separately.

SUMMARY OF THE DISCLOSURE

According to an aspect of the present disclosure, a radiation imaging apparatus includes a radiation detector including a plurality of pixels arranged in a matrix and configured to output a signal based on a charge accumulated in the plurality of pixels, and one or more controllers being configured to acquire first output information and then acquire second output information being information about the charge accumulated in the plurality of pixels without radiation irradiation on the radiation detector, the first output information being information about the charge accumulated in the plurality of pixels with radiation irradiation on the radiation detector, wherein the first output information and the second output information are information for acquiring a corrected radiation image, and wherein an output value of a predetermined row that is included in the first output information is an output value of the charge accumulated over a first period, and an output value of the predetermined row that is included in the second output information is an output value of the charge accumulated over a second period, the second period being longer than the first period.

Further features of the present disclosure will become apparent from the following description of exemplary embodiments with reference to the attached drawings.

BRIEF DESCRIPTION OF THE DRAWINGS

FIGS. 4A and 4B are diagrams illustrating drive timings of the radiation imaging apparatus according to the first exemplary embodiment.

FIG. 5 is a diagram illustrating drive timings of the radiation imaging apparatus according to the first exemplary embodiment.

FIG. 6 is a diagram illustrating a correction mechanism of the radiation imaging apparatus according to the first exemplary embodiment.

FIG. 7 is a diagram illustrating a correction mechanism of the radiation imaging apparatus according to the first exemplary embodiment.

DESCRIPTION OF THE EMBODIMENTS

Figure 1:
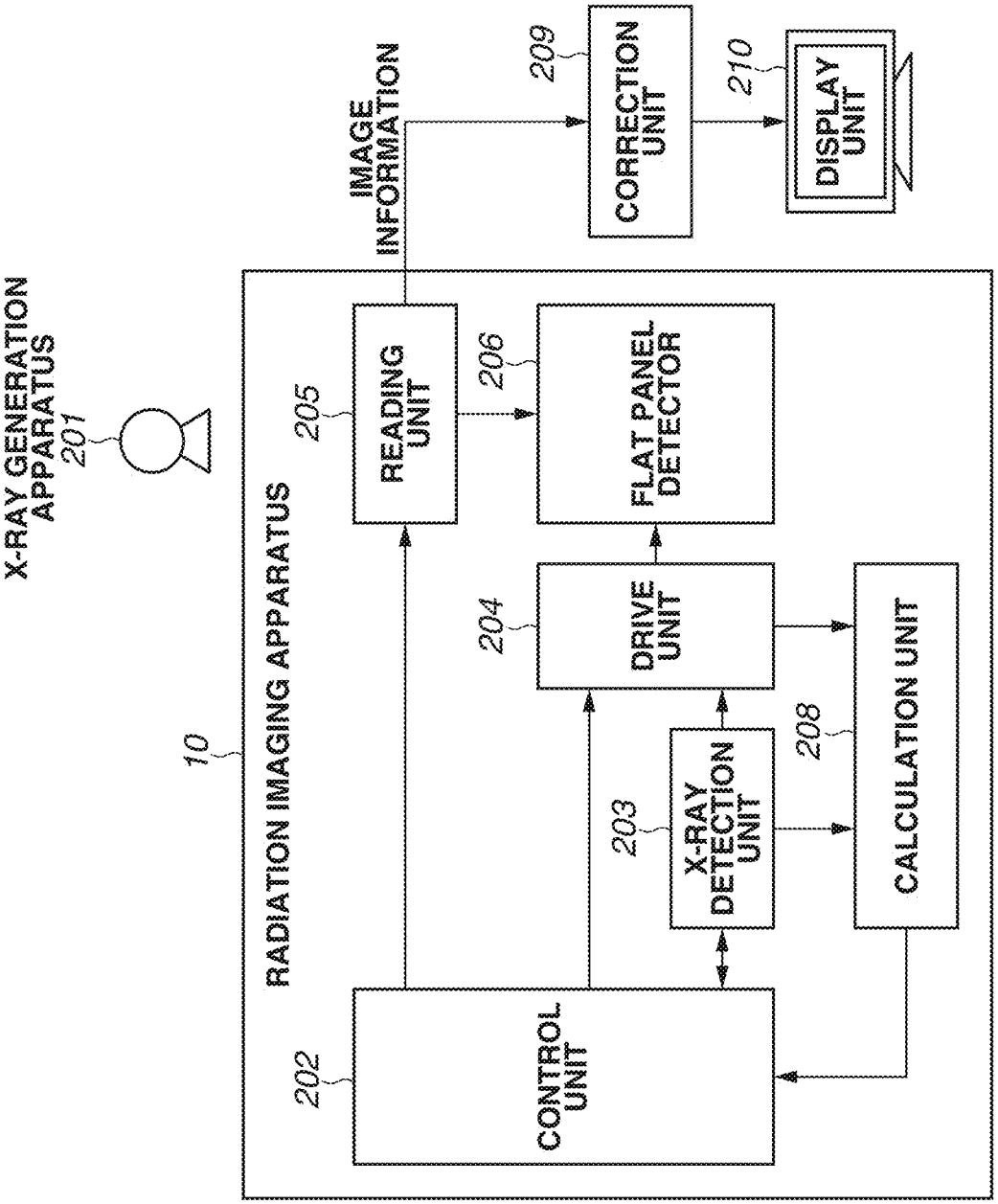
FIG. 1 is a diagram illustrating an example of a configuration of a radiation imaging system according to a first exemplary embodiment.

FIG. 1 is a block diagram illustrating an example of a configuration of a radiation imaging system according to a first exemplary embodiment. The term "radiation" refers to α-rays, β-rays, and γ-rays, which are beams formed of particles (including photons) emitted by radioactive decay, and beams having the same or higher energies, e.g., X-rays, particle beams, and cosmic rays. A case where radiation is an X-ray will be described below.

The radiation imaging system includes an X-ray generation apparatus 201, a radiation imaging apparatus 10 including a control unit 202, an X-ray detection unit 203, a drive unit 204, a reading unit 205, a flat panel detector 206, and a calculation unit 208, a correction unit 209, and a display unit (or computer) 210. The control unit 202 controls the X-ray detection unit 203, the drive unit 204, and the reading unit 205. The drive unit 204 drives the flat panel detector 206.

The X-ray generation apparatus (radiation generation apparatus) 201 irradiates the flat panel detector 206 and the X-ray detection unit 203 with X-rays (radiation) through a subject. The flat panel detector 206 includes a plurality of pixels arranged in a matrix with X columns and Y rows, and each pixel converts the X-rays having transmitted through the subject into charges, accumulates the charges, and outputs the accumulated charges as pixel output values. The X-ray detection unit 203 detects a start and an end of X-ray irradiation and outputs X-ray irradiation signals to the control unit 202.

In a case where the X-ray detection unit 203 detects a start of X-ray irradiation, the flat panel detector 206 starts accumulating charges corresponding to the X-rays, and in a case where the X-ray detection unit 203 detects an end of the X-ray irradiation, the flat panel detector 206 outputs pixel output values corresponding to the accumulated charges to the reading unit 205. Then, the reading unit 205 outputs image information corresponding to the X-ray irradiation on the pixels of the matrix with the X columns and the Y rows.

Figure 4A:
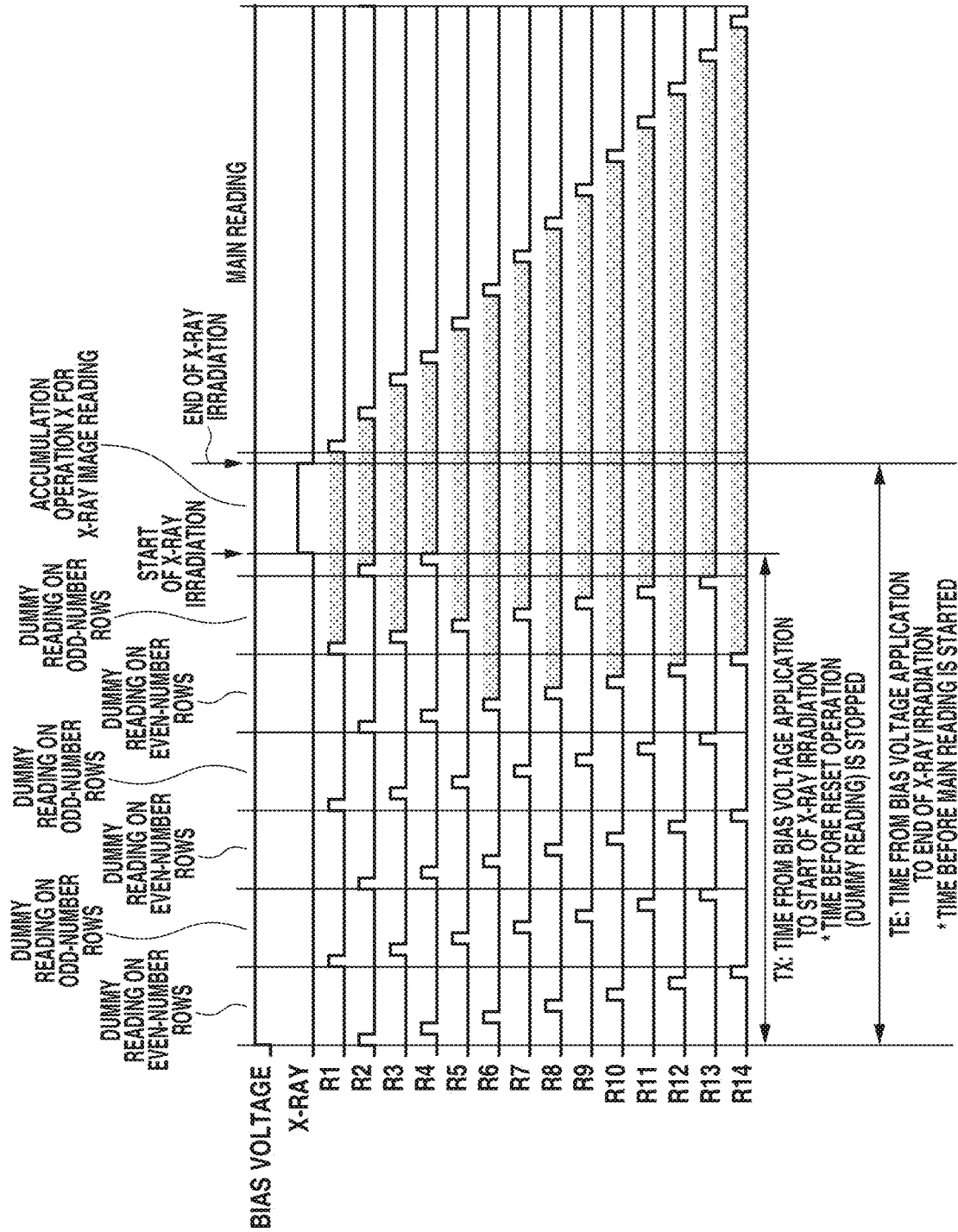

The X-ray detection unit 203 outputs time TX and time TE to the calculation unit 208. The time TX is time from a bias voltage application start time to an X-ray irradiation start detection time, as illustrated in FIG. 4A. The time TE is time from the bias voltage application start time to an X-ray irradiation end detection time, as illustrated in FIG. 4A. The drive unit 204 outputs, to the calculation unit 208, a row RX where a reset operation (dummy reading) is stopped at the time of starting the X-ray irradiation, as illustrated in FIG. 4A.

The calculation unit 208 outputs, to the control unit 202, the time TX, which is from the bias voltage application start time to the X-ray irradiation start detection time, the time TE, which is from the bias voltage application start time to the X-ray irradiation end detection time, and the row RX where the reset operation (dummy reading) is stopped.

The control unit 202 performs control to repeat the reset operation and perform the accumulation operation based on information from the calculation unit 208. Thereafter, the control unit 202 outputs pixel output values corresponding to the accumulated charges to the reading unit 205. Then, the reading unit 205 outputs offset image information without X-ray irradiation on the pixels of the matrix with the X columns and the Y rows. The correction unit 209 corrects the image information by subtracting the offset image information without the X-ray irradiation from the image information corresponding to the X-ray irradiation.

The display unit (or computer) 210 displays (or processes) the image information corrected by the correction unit 209. The display unit (or computer) 210 can include various input devices, such as a keyboard and a touch panel.

Figure 2:
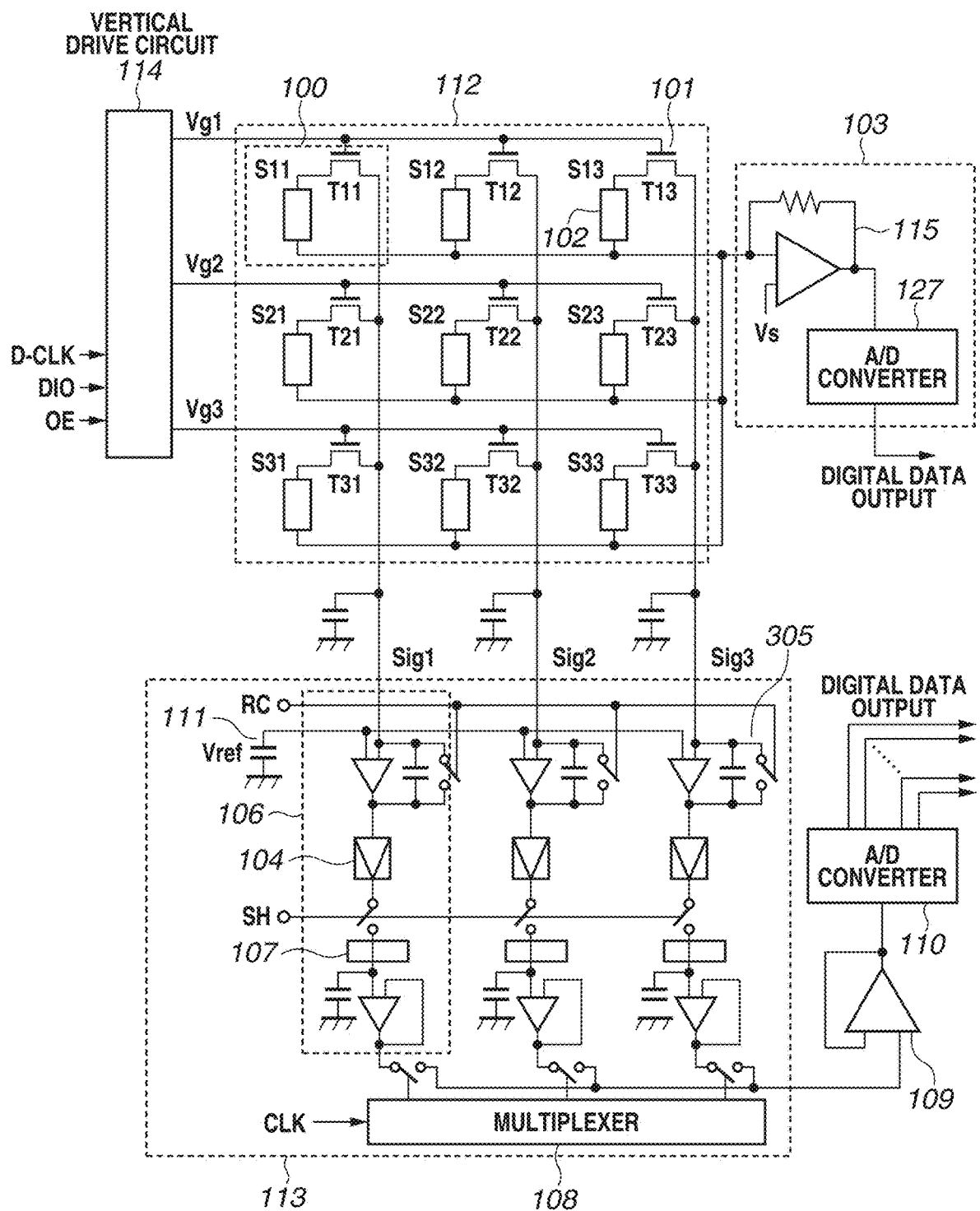
FIG. 2 is a diagram illustrating an example of a structure of a radiation imaging apparatus according to the first exemplary embodiment.

FIG. 2 is a diagram illustrating an example of a more detailed structure of the drive unit 204, the reading unit 205, and the flat panel detector 206 of the radiation imaging apparatus 10 in FIG. 1. The flat panel detector 206 includes a vertical drive circuit 114, a detection portion 112, and a bias power source portion 103. The reading unit 205 includes a reading circuit 113, an output buffer amplifier 109, and an analog/digital (A/D) converter 110.

The flat panel detector 206 is a sensor including pixels 100 arranged in a two-dimensional matrix. Each pixel 100 is an element that detects radiation. The flat panel detector 206 detects radiation and outputs image information. For simplification of description, the detection portion 112 including the pixels 100 arranged in a matrix with three rows and three columns is illustrated as an example in FIG. 2. In actuality, however, the flat panel detector 206 includes numerous pixels. For example, a 17-inch flat panel detector includes pixels arranged in a matrix with about 2800 rows and about 2800 columns.

The detection portion 112 includes the plurality of pixels 100 arranged in matrix. Each pixel 100 includes one of conversion elements S11 to S33 and one of switch elements T11 to T33. The conversion elements S11 to S33 convert radiation or light into charges, and the switch elements T11 to T33 output electric signals corresponding to the charges of the conversion elements S11 to S33. The plurality of pixels 100 outputs pixel output values.

The conversion elements S11 to S33 may be indirect-type or direct-type conversion elements that convert radiated radiation into charges. The indirect-type conversion elements S11 to S33 include wavelength conversion elements and photoelectric conversion elements. The wavelength conversion elements convert radiation into light, and the photoelectric conversion elements convert the light into charges. The direct-type conversion elements S11 to S33 convert radiation directly into charges. The photoelectric conversion elements for converting radiated light into charges can be metal-insulator-semiconductor (MIS) photodiodes placed on an insulative substrate, such as a glass substrate, and using amorphous silicon as a main material. Further, the photoelectric conversion elements can be PIN photodiodes.

The switch elements T11 to T33 are transistors each including a control terminal and two main terminals and are desirably thin-film transistors (TFT). Each of the conversion elements S11 to S33 includes an electrode connected electrically to one of the two main terminals of the corresponding one of the switch elements T11 to T33 and another electrode connected electrically to the bias power source portion 103 via a common bias line.

The control terminals of the plurality of switch elements T11 to T13 of the first row are electrically connected to a common drive line of the first row. The control terminals of the plurality of switch elements T21 to T23 of the second row are electrically connected to a common drive line of the second row. The control terminals of the plurality of switch elements T31 to T33 of the third row are electrically connected to a common drive line.

The vertical drive circuit 114 is, for example, a shift register and controls conductive states of the switch elements T11 to T33 in units of row by feeding drive signals to the switch elements T11 to T33 via the drive lines.

One of the main terminals of each of the plurality of switch elements T11 to T31 of the first column is connected to the corresponding one of the conversion elements S11 to S31, and the other one of the main terminals is electrically connected to a signal line Sig1 of the first column. While the switch elements T11 to T31 of the first column are in the conductive state, electric signals corresponding to the charges of the conversion elements S11 to S31 of the first column are output to the reading circuit 113 via the signal line Sig1.

One of the main terminals of each of the plurality of switch elements T12 to T32 of the second column is connected to the corresponding one of the conversion elements S12 to S32, and the other one of the main terminals is electrically connected to a signal line Sig2 of the second column. While the switch elements T12 to T32 of the second column are in the conductive state, electric signals corresponding to the charges of the conversion elements S12 to S32 of the second column are output to the reading circuit 113 via the signal line Sig2.

One of the main terminals of each of the plurality of switch elements T13 to T33 of the third column is connected to the corresponding one of the conversion elements S13 to S33, and the other one of the main terminals is electrically connected to a signal line Sig3 of the third column. While the switch elements T13 to T33 of the third column are in the conductive state, electric signals corresponding to the charges of the conversion elements S13 to S33 of the third column are output to the reading circuit 113 via the signal line Sig3. The plurality of signal lines Sig1 to Sig3 arranged in a column direction outputs the electric signals output from the plurality of pixels 100 to the reading circuit 113 in parallel.

The reading circuit 113 includes an amplification circuit 106 for each of the signal lines Sig1 to Sig3. Amplification circuits 106 amplify the electric signals from the signal lines Sig1 to Sig3. Each of the amplification circuit 106 includes an integrating amplifier 105, a variable gain amplifier 104, and a sample-and-hold circuit 107.

Integrating amplifiers 105 amplify electric signals from the signal lines Sig1 to Sig3. Variable gain amplifiers 104 amplify the electric signals from the integrating amplifiers 105 at a variable gain. Sample-and-hold circuits 107 sample the electric signals amplified by the variable gain amplifiers 104 and hold the sampled electric signals. Each integrating amplifier 105 includes an operational amplifier, an integration capacitor, and a reset switch. Operational amplifiers 121 amplify the electric signals from the signal lines Sig1 to Sig3 and output the amplified electric signals.

The gain (amplification factor) of each of the integrating amplifiers 105 can be changed by changing a value of the corresponding integration capacitor. The operational amplifier of each column includes an inverting input terminal connected to the corresponding one of the signal lines Sig1 to Sig3, a non-inverting input terminal connected to a reference power source portion 111 of a reference voltage Vref, and an output terminal. The output terminal outputs amplified electric signals.

The reference power source portion 111 feeds the reference voltage Vref to the non-inverting input terminals of the operational amplifiers. Each integration capacitor is disposed between the inverting input terminal and the output terminal of the corresponding operational amplifier.

Each sample-and-hold circuit 107 includes a sampling switch for a control signal SH and a sampling capacitor. Further, the reading circuit 113 includes a switch for each column and a multiplexer 108.

The multiplexer 108 sequentially outputs electric signals output in parallel from the amplification circuits 106 as serial signals to the output buffer amplifier 109 by sequentially changing switches of the columns to the conductive state. The output buffer amplifier 109 performs impedance conversion on the electric signals and outputs the resulting electric signals. The A/D converter 110 converts the analog electric signals output from the output buffer amplifier 109 into digital electric signals and outputs the digital electric signals as image information to the correction unit 209 illustrated in FIG. 1.

The bias power source portion 103 includes a current-voltage conversion circuit 115 and an A/D converter 127. While feeding a bias voltage Vs to the bias line, the current-voltage conversion circuit 115 converts current flowing in the bias line into voltage and outputs the voltage to the A/D converter 127. The A/D converter 127 converts analog voltage values including current information into digital voltage values including the current information and outputs the digital voltage values. The X-ray detection unit 203 in FIG. 1 detects a start and an end of X-ray irradiation using the current information output from the A/D converter 127.

The vertical drive circuit 114 outputs, to the drive lines, drive signals including a conducting voltage for changing the switch elements T11 to T33 to the conductive state and drive signals including a non-conducting voltage for changing the switch elements T11 to T33 to the non-conductive state, based on control signals D-CLK, OE, and DIO input from the drive unit 204 in FIG. 1. By the foregoing operation, the vertical drive circuit 114 controls the conductive and non-conductive states of the switch elements T11 to T33 and drives the detection portion 112.

The control signal D-CLK is a shift clock of the shift register used as the vertical drive circuit 114. The control signal DIO is a transfer pulse of the shift register used as the vertical drive circuit 114. The control signal OE is an output enable signal of the shift register used as the vertical drive circuit 114. With the foregoing control signals D-CLK, OE, and DIO, the vertical drive circuit 114 controls a drive time and a scan direction.

Further, the drive unit 204 controls operations of the components of the reading circuit 113 by outputting control signals RC, SH, and CLK to the reading circuit 113.

The control signal RC is a signal for controlling operations of reset switches of the integrating amplifiers 105. The control signal SH is a signal for controlling sampling switches of the sample-and-hold circuits 107. The control signal CLK is a clock signal for controlling operations of the multiplexer 108.

Figure 3:
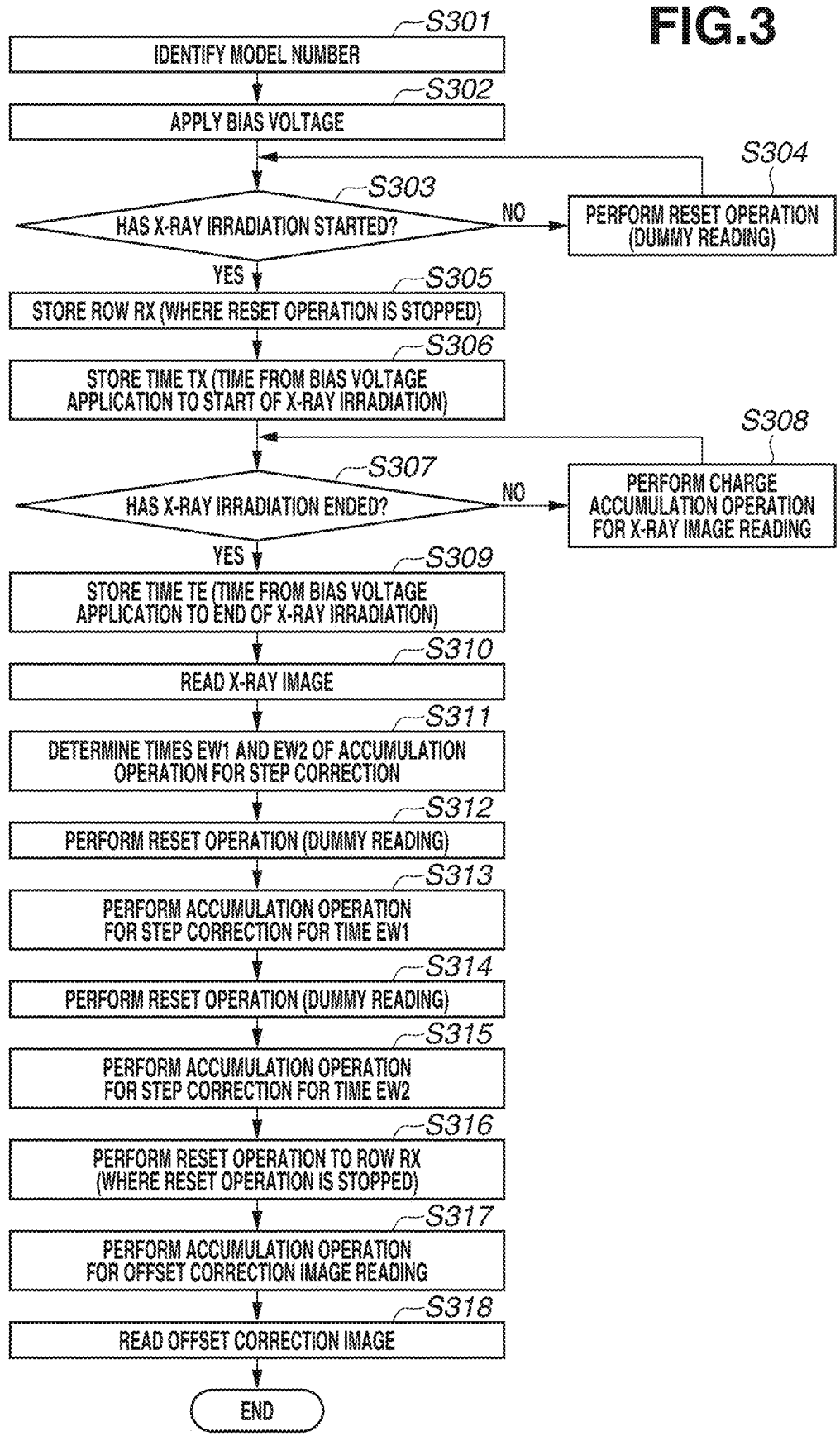
FIG. 3 is a flowchart illustrating operations of the radiation imaging apparatus according to the first exemplary embodiment.

FIG. 3 is a flowchart illustrating a method for controlling the radiation imaging system illustrated in FIG. 1, and FIGS. 4A and 4B are diagrams illustrating timings of the control method. In step S301, a model number of the flat panel detector 206 is identified. In step S302, the current-voltage conversion circuit 115 starts applying the bias voltage Vs to the bias line, as illustrated in FIG. 4A.

Next, in step S303, the control unit 202 determines whether X-ray irradiation has started. The X-ray detection unit 203 outputs an X-ray irradiation signal to the control unit 202 in a case where the current information (electric signals corresponding to radiated X-rays) output from the A/D converter 127 becomes higher than or equal to a threshold. In a case where the X-ray irradiation signal is input, the control unit 202 determines that X-ray irradiation has started, whereas in a case where no X-ray irradiation signal is input, the control unit 202 determines that X-ray irradiation has not started. In a case where X-ray irradiation has started (YES in step S303), the processing proceeds to step S305, whereas in a case where X-ray irradiation has not started (NO in step S303), the processing proceeds to step S304.

In step S304, the detection portion 112 controlled by the control unit 202 sequentially changes drive lines R1 to R14 to the conducting voltage and changes the switch elements T11 to T33 to the conductive state, as illustrated in FIG. 4A. Consequently, the reset operation of resetting the charges of the conversion elements S11 to S33 that are generated by dark current charge accumulation. Thereafter, the processing returns to step S303. The detection portion 112 repeatedly performs the reset operation of resetting the charges of the conversion elements S11 to S33 that are generated by dark current, prior to X-ray irradiation.

In the reset operation (dummy reading) in step S304, for example, an interlaced reset operation is performed as illustrated in FIG. 4A. First, the drive lines R2, R4, R6, . . . and R14 of the pixels 100 of the even-number rows are sequentially changed to the conducting voltage, and the switch elements of the pixels 100 of the even-number rows, such as the switch elements T21 and T41, are sequentially changed to the conductive state. Then, the charges of the conversion elements of the pixels 100 of the even-number rows, such as the conversion elements S21 and S41, are reset.

Next, the drive lines R1, R3, R5, ... and R13 of the pixels 100 of the odd-number rows are sequentially changed to the conducting voltage, and the switch elements of the pixels 100 of the odd-number rows, such as the switch elements T11 and T31, are sequentially changed to the conductive state. Then, the charges of the conversion elements of the pixels 100 of the odd-number rows, such as the conversion elements S11 and S31, are reset. The operations of a combination of resetting the even-number rows and resetting the odd-number rows as described above are performed repeatedly until a start of X-ray irradiation is detected.

In step S305, after the start of X-ray irradiation is detected, the drive unit 204 stores an X-ray detection row RX. The X-ray detection row RX specifies the row RX where the reset operation (dummy reading) is stopped due to the start of X-ray irradiation. In FIG. 4A, the X-ray detection row RX is the fourth row corresponding to the drive line R4.

Next, in step S306, the drive unit 204 receives the time TX input from the X-ray detection unit 203 via the control unit 202 and stores the time TX. The time TX is the time from the bias voltage application start time to the X-ray irradiation start detection time, as illustrated in FIG. 4A.

Next, in step S307, the control unit 202 determines whether the X-ray irradiation has ended. The X-ray detection unit 203 stops outputting X-ray irradiation signals in a case where the current information (electric signals corresponding to radiated X-rays) output from the A/D converter 127 becomes lower than the threshold. Further, the X-ray detection unit 203 can stop outputting the X-ray irradiation signals after a predetermined time (X-ray irradiation period) from the X-ray irradiation start detection time.

In a case where the input of the X-ray irradiation signals is stopped, the control unit 202 determines that the X-ray irradiation has ended, whereas in a case where the X-ray irradiation signals are still input, the control unit 202 determines that the X-ray irradiation has not ended. In the case where the X-ray irradiation has ended (YES in step S307), the processing proceeds to step S309, whereas in the case where the X-ray irradiation has not ended (NO in step S307), the processing proceeds to step S308. In step S308, the detection portion 112 controlled by the control unit 202 performs a charge accumulation operation. Thereafter, the processing returns to step S307.

The charge accumulation operation is an operation of changing all the drive lines R1 to R14 to the non-conducting voltage, changing all the switch elements T11 to T33 of the pixels 100 to the non-conductive state, and accumulating charges corresponding to radiated X-rays in the conversion elements S11 to S33, as illustrated in FIG. 4A. The charge accumulation operation is performed on the conversion elements S11 to S33 until the X-ray irradiation ends.

In step S309, after the end of the X-ray irradiation is detected, the drive unit 204 receives the time TE input from the X-ray detection unit 203 via the control unit 202 and stores the time TE. The time TE is the time from the bias voltage application start time to the X-ray irradiation end detection time, as illustrated in FIG. 4A.

Next, in step S310, the detection portion 112 controlled by the control unit 202 performs a reading operation of reading the charges corresponding to the radiated X-rays. In the reading operation, the drive lines R1 to R14 are sequentially changed to a pulse of the conducting voltage, the switch elements T11 to T33 are sequentially changed to the conductive state in units of row, and electric signals from the pixels 100 of the first to last rows are sequentially output in units of row to the signal lines Sig1 to Sig3. The A/D converter 110 outputs image information corresponding to the radiated X-rays from the pixels 100 of the first to last rows.

Next, in step S311, times EW1 and EW2 of the accumulation operation for step correction are determined.

Specifically, the times EW1 and EW2 are determined from the time TX, which is from the bias voltage application start time to the X-ray irradiation start detection time, and the time TE, which is from the bias voltage application start time to the X-ray irradiation end detection time, based on a dark current component included in each of the pixels 100 during X-ray imaging.

During the times EW1 and EW2 of the accumulation operation for step correction, the same operation as the accumulation operation for X-ray image reading in step S308 and the accumulation operation for offset correction image reading in step S317 is performed, and the operation is an accumulation operation for intentionally adding time for step correction. In a case where the times EW1 and EW2 of the accumulation operation for step correction are to be determined only from the time TX, which is from the bias voltage application start time to the X-ray irradiation start detection time, step S311 can be performed between steps S306 and S307.

Next, in step S312, an interlaced reset operation is performed as in the reset operation (dummy reading) in step S304. First, the drive lines R2, R4, R6, ... and R14 of the pixels 100 of the even-number rows are sequentially changed to the conducting voltage, and the switch elements of the pixels 100 of the even-number rows, such as the switch elements T21 and T41, are sequentially changed to the conductive state. Then, the charges of the conversion elements of the pixels 100 of the even-number rows, such as the conversion elements S21 and S41, are reset.

Next, the drive lines R1, R3, R5, ... and R13 of the pixels 100 of the odd-number rows are sequentially changed to the conducting voltage, and the switch elements of the pixels 100 of the odd-number rows, such as the switch elements T11 and T31, are sequentially changed to the conductive state. Then, the charges of the conversion elements of the pixels 100 of the odd-number rows, such as the conversion elements S11 and S31 are reset. At this time, in a case where the row RX where the reset operation (dummy reading) is stopped is an even-number row, the reset operation is performed on the even-number rows across all the drive lines, and step S312 is ended.

In a case where the row RX where the reset operation (dummy reading) is stopped is an odd-number row, the reset operation is performed on the odd-number rows across all the drive lines, and step S312 is ended. The number of times of a prior repeat of the reset operation (dummy reading) on the even-number rows and the reset operation (dummy reading) on the odd-number rows can be set to any number greater than or equal to zero.

Next, in step S313, the detection portion 112 controlled by the control unit 202 performs the charge accumulation operation only for the time EW1 of the accumulation operation for step correction that is determined in step S311. The charge accumulation operation is an operation of changing all the drive lines R1 to R14 to the non-conducting voltage, changing all the switch elements T11 to T33 of the pixels 100 to the non-conductive state, and accumulating charges corresponding to radiated X-rays in the conversion elements S11 to S33, as illustrated in FIG. 4B.

Next, in step S314, the reset operation (dummy reading) is performed as in step S304. In the case where the row RX where the reset operation (dummy reading) is stopped is an even-number row, the reset operation is performed on the odd-number rows across all the drive lines, and step S314 is ended. In the case where the row RX where the reset operation (dummy reading) is stopped is an odd-number row, the reset operation is performed on the even-number rows across all the drive lines, and step S314 is ended.

Next, in step S315, the detection portion 112 controlled by the control unit 202 performs the charge accumulation operation only for the time EW2 of the accumulation operation for step correction that is determined in step S311. The charge accumulation operation is an operation of changing all the drive lines R1 to R14 to the non-conducting voltage, changing all the switch elements T11 to T33 of the pixels 100 to the non-conductive state, and accumulating charges corresponding to radiated X-rays in the conversion elements S11 to S33, as illustrated in FIG. 4B.

Next, in step S316, in the case where the row RX where the reset operation (dummy reading) is stopped is an even-number row, the reset operation is performed on the even-number rows up to the row RX where the reset operation (dummy reading) is stopped, and step S316 is ended. In the case where the row RX where the reset operation (dummy reading) is stopped is an odd-number row, the reset operation is performed on the odd-number rows up to the row RX where the reset operation (dummy reading) is stopped, and step S316 is ended.

Next, in step S317, the charge accumulation operation is performed only for an amount of time calculated by subtracting the time TX, which is from the bias voltage application start time to the X-ray irradiation start detection time, from the time TE, which is from the bias voltage application start time to the X-ray irradiation end detection time.

The charge accumulation operation is an operation of changing all the drive lines R1 to R14 to the non-conducting voltage, changing all the switch elements T11 to T33 of the pixels 100 to the non-conductive state, and accumulating charges corresponding to radiated X-rays in the conversion elements S11 to S33, as illustrated in FIG. 4B.

Next, in step S318, the detection portion 112 controlled by the control unit 202 performs the reading operation of reading charges without X-ray irradiation. In the reading operation, the drive lines R1 to R14 are sequentially changed to the pulse of the conducting voltage, the switch elements T11 to T33 are sequentially changed to the conductive state in units of row, and electric signals from the pixels 100 of the first to last rows are sequentially output in units of row to the signal lines Sig1 to Sig3. The A/D converter 110 outputs image information without X-ray irradiation from the pixels 100 of the first to last rows.

Next, a mechanism for reducing artifacts in the shape of steps (stripes) between the even- and odd-number rows that occur in a row direction will be described below. FIG. 5 is a diagram illustrating drive timings of the radiation imaging system after the bias voltage application. The control unit 202 repeatedly scans a first group of scan rows and a second group of scan rows until a start of radiation irradiation is detected, i.e., the control unit 202 performs an interlaced reset operation 505.

In a case where a start of radiation irradiation is detected by the X-ray detection unit 203, the control unit 202 stops the reset operation in scanning. During a period until an end of the radiation irradiation, the control unit 202 performs an accumulation operation 506 for radiation image reading. Then, the control unit 202 performs a radiation image reading operation 507. Thereafter, the control unit 202 performs again an interlaced reset operation 508 of repeatedly scanning the first group of scan rows and the second group of scan rows. The control unit 202 scans up to a detection row of a detection group where the radiated radiation is detected, and then the control unit 202 stops the scanning, performs an accumulation operation 509 for offset image reading, performs an offset correction image reading operation 510, and reads an offset correction image.

In FIG. 5, a case where the row RX where the reset operation 505 is stopped due to the start of X-ray irradiation is the fourth row corresponding to the drive line R4 where an X-ray is detected is illustrated. A dark current component 501 is generated during the charge accumulation time of the odd-number row R3 in the reset operation 505, the accumulation operation 506 for radiation image reading, and the radiation image reading operation 507. A dark current component 503 is generated during the charge accumulation time of the odd-number row R3 in the reset operation 508, the accumulation operation 509 for offset image reading, and the offset correction image reading operation 510.

A dark current component 502 is generated during the charge accumulation time of the even-number row (drive line) R4 in the reset operation 505, the accumulation operation 506 for radiation image reading, and the radiation image reading operation 507. A dark current component 504 is generated during the charge accumulation time of the even-number row R4 in the reset operation 508, the accumulation operation 509 for offset image reading, and the offset correction image reading operation 510.

In this case, as illustrated in FIG. 5, the dark current component 501 included in the odd-number row (drive line) R3 of the radiation image and the dark current component 503 included in the odd-number row R3 of the offset correction image are not the same. The dark current component 502 included in the even-number row R4 of the radiation image and the dark current component 504 included in the even-number row R4 of the offset correction image are also not the same.

Consequently, the dark current components of the odd-number row R3 and the even-number row R4 are not canceled completely even in an image after the offset correction by subtracting the image information without X-ray irradiation from the image information corresponding to the X-ray irradiation, and residual dark current components remain. A difference between the residual dark current components of the rows R3 and R4 causes step-shaped artifacts in the radiation image.

Thus, as illustrated in FIG. 6, an amount of accumulation time of at least one of an accumulation operation 605 after the reset operation on the first group and an accumulation operation 606 after the reset operation on the second group is added during the period of scanning the first group and the second group in the reset operation after the radiation image reading operation. Thereafter, similar to FIG. 5, the scanning is performed up to the detection row of the detection group where the radiated radiation is detected, and then the scanning is stopped. Thereafter, the accumulation operation for offset correction image reading is performed, and after the accumulation operation for offset correction image reading, an offset correction image is read.

Specifically, by further adding the amount of accumulation time between the start and end of the reset operation after the radiation image reading operation, the time of the reset operation after the radiation image reading operation becomes longer than the time of the reset operation before the radiation image reading operation. Consequently, the dark current component included in the radiation image and the dark current component included in the offset correction image correspond to each other, so that artifacts that occur in the radiation image are reduced.

The accumulation operation 606 for step correction for the amount of time increases a dark current component 603 included in the odd-number row R3 of the offset correction image. Consequently, a difference between the dark current components of the odd-number row R3 and the even-number row R4 decreases in the image after the offset correction obtained by subtracting the image information without X-ray irradiation from the image information corresponding to the X-ray irradiation, and the step is reduced.

FIG. 7 is a diagram illustrating drive timings of the radiation imaging apparatus 10 after the bias voltage application.

As in FIG. 6, an accumulation operation 705 or 706 for step correction for an amount of time is added to at least one of the first group and the second group during the period of scanning the first group and the second group in the reset operation after the radiation image reading operation, and the scanning is performed. Differences between FIG. 7 and FIG. 6 will be described below.

The accumulation operation 705 for step correction for the amount of time increases a dark current component 705 included in the even-number row (drive line) R6 of the offset correction image. Consequently, the difference between the dark current components of the odd-number row (drive line) R5 and the even-number row R6 decreases in the image after the offset correction by subtracting the image information without X-ray irradiation from the image information corresponding to the X-ray irradiation, and the step is reduced.

As illustrated in FIG. 7, a magnitude relationship between the charge accumulation time of the odd-number rows and the charge accumulation time of the even-number rows is reversed at the row RX (corresponding to the row R4 in FIG. 7) where the reset operation 505 is stopped due to the start of the X-ray irradiation. From this characteristic, the accumulation operations 705 and 706 for step correction are performed during both the scanning on the first group and the scanning on the second group. The accumulation operation 705 for step correction corrects steps in the rows after the row RX, whereas the accumulation operation 706 for step correction corrects steps in the rows before the row RX.

As illustrated in FIG. 7, a dark current component 702 included in the odd-number row R5 of the radiation image and a dark current component 701 included in the even-number row R6 of the radiation image are different from each other. Thus, the time of the accumulation operation 705 for step correction and the time of the accumulation operation 706 for step correction do not necessarily have to be the same.

While the interlaced reset operations in which there is a great difference in the charge accumulation time and artifacts occur prominently are described above as an example, the present exemplary embodiment is not limited to the example described above.

For example, the reset operation can be performed sequentially on R1, R2, R3, etc. row by row in FIG. 5. Even in this case, there is a difference in charge accumulation time between the rows before and after the row where the reset operation 505 is stopped, so that the accumulation operations for step correction according to the present exemplary embodiment still produce the artifact reduction effect.

In the detection portion 112, a dark current is generated even during a period in which no X-rays are radiated. Thus, the longer an accumulation time 707, the greater the dark current components 701 and 702. The shorter the accumulation time 707, the smaller the dark current components 701 and 702. From this characteristic, the control unit 202 controls at least one of the time of the accumulation operation 705 for step correction and the time of the accumulation operation 706 for step correction based on the accumulation time 707 corresponding to the time calculated by subtracting the time TX from the time TE.

Specifically, the longer the accumulation time 707 is, the longer the time of at least one of the accumulation operations 705 and 706 for step correction is set. The shorter the accumulation time 707 is, the shorter the time of at least one of the accumulation operations 705 and 706 for step correction is set. By the foregoing control, differences between dark current components of adjacent rows are reduced, and steps are reduced. The calculation unit 208 can include a table with a vertical axis representing the accumulation time 707 and a horizontal axis representing the time of the accumulation operation 705 or 706 for step correction and can control the time of the accumulation operation 705 or 706 for step correction based on the accumulation time 707.

In the detection portion 112, the dark currents change depending on the time TX, which is from the bias voltage application start time to the X-ray irradiation start detection time. Specifically, the shorter the time TX is, the more sharply the dark currents change, and the differences between dark current components of adjacent rows increase. The longer the time TX, the smaller the differences between dark current components of adjacent rows. From this characteristic, the time of at least one of the accumulation operations 705 and 706 for step correction can be controlled based on the time to the time TX, which is from the bias voltage application start time to the X-ray irradiation start detection time.

Specifically, the shorter the time TX, which is from the bias voltage application start time to the X-ray irradiation start detection time, is, the longer the time of at least one of the accumulation operations 705 and 706 for step correction is set. The longer the time TX, which is from the bias voltage application start time to the X-ray irradiation start detection time, is, the shorter the time of at least one of the accumulation operations 705 and 706 for step correction is set. By the foregoing control, the differences between dark current components of adjacent rows are reduced, and steps are reduced.

The calculation unit 208 can include a table with a vertical axis representing the time TX and a horizontal axis representing the time of the accumulation operation 705 or 706 for step correction and can control the time of the accumulation operation 705 or 706 for step correction based on the time TX.

The control unit 202 can include a temperature detection portion for monitoring ambient temperature. The dark currents of the pixels 100 change also depending on the ambient temperature. For example, the higher the ambient temperature is, the more sharply the dark currents change, whereas the lower the ambient temperature is, the more gradually the dark currents change. From this characteristic, the time of at least one of the accumulation operations 705 and 706 for step correction is to be controlled based on the ambient temperature.

Specifically, in a case where the ambient temperature is high, the time of at least one of the accumulation operations 705 and 706 for step correction is to be set longer than the time in a case where the ambient temperature is low. By the foregoing control, the differences between dark current components of adjacent rows are reduced, and artifacts in the radiation image are reduced.

In this case, the calculation unit 208 can include a table with a vertical axis representing the ambient temperature and a horizontal axis representing the time of the accumulation operation 705 or 706 for step correction and can control the time of the accumulation operation 705 or 706 for step correction based on the ambient temperature.

Further, the dark current components may be different even at the same temperature depending on a sensor type (difference in size, manufacture) of the flat panel detector 206. Thus, for example, the calculation unit 208 can have a function of identifying the sensor type to identify the sensor type of the flat panel detector 206 at the timing of step S301 in FIG. 3.

For each identified sensor type of the flat panel detector 206, the time of the accumulation operation 705 or 706 for step correction can be controlled based on the temperature monitored by the temperature detection portion. For example, the calculation unit 208 can include a table storing sensor types, ambient temperatures, and accumulation operations for step correction and can determine an accumulation operation for step correction based on the sensor type and the ambient temperature.

A unit other than the calculation unit 208 can have the sensor type identification function, or a user can input a sensor type using an input unit of the display unit (or computer) 210.

The time of at least one of the accumulation operations 705 and 706 for step correction can be controlled based on a combination of at least one or more of the accumulation time 707, the time TX, which is from the bias voltage application start time to the X-ray irradiation start detection time, and the ambient temperature.

As described above, the calculation unit 208 can control the time of the accumulation operation 705 or 706 for step correction based on the accumulation time 707, the time TX, which is from the bias voltage application start time to the X-ray irradiation start detection time, the ambient temperature, and the sensor type. By determining the time of the accumulation operation 705 or 706 for step correction as described above, artifacts caused by the reset operations are reduced, and radiation images with fine image quality are obtained.

The following appendixes are disclosed as an aspect of the present disclosure and an optional feature in connection with the above-described exemplary embodiments.

APPENDIX 1

A radiation imaging apparatus includes a detection portion including a plurality of pixels arranged in a matrix and configured to convert radiation into a charge and output a pixel output value, and a control unit configured to cause the detection portion to perform a first reset operation of resetting the charge in the plurality of pixels by applying a drive signal in units of row during an accumulation operation of accumulating the charge in the plurality of pixels, a first accumulation operation of accumulating the charge based on the radiated radiation in the plurality of pixels, a first reading operation of outputting image information corresponding to the radiated radiation from the plurality of pixels, a second reset operation of resetting the charge in the plurality of pixels in units of row by applying a drive signal in units of row during an accumulation operation of accumulating the charge in the plurality of pixels, a second accumulation operation of accumulating charge for use in offset correction of the image information, and a second reading operation of outputting offset image information, in this order, and the control unit causes the detection portion to perform the second reset operation so that time of the second reset operation becomes longer than time of the first reset operation.

APPENDIX 2

The control unit can cause the detection portion to perform the first reset operation and the second reset operation by an interlaced method in which first and second groups of the plurality of pixels are scanned alternately.

APPENDIX 3

The control unit can cause a third accumulation operation of accumulating the charge in the plurality of pixels to be performed both during scanning on the first group and during scanning on the second group in the first reset operation so that the time of the second reset operation becomes longer than the time of the first reset operation.

APPENDIX 4

The control unit can control time of the third accumulation operation performed during the scanning on the first group and time of the third accumulation operation performed during the scanning on the second group.

APPENDIX 5

The control unit can control the time of the third accumulation operation performed during the scanning on the first group and the time of the third accumulation operation performed during the scanning on the second group time so that the former time becomes different from the latter time.

APPENDIX 6

The control unit can control the time of the third accumulation operation based on time of the first accumulation operation.

APPENDIX 7

The control unit can control the time of the third accumulation operation to be longer in a case where the time of the first accumulation operation is long than in a case where the time of the first accumulation operation is short.

APPENDIX 8

The radiation imaging apparatus includes a detection unit configured to detect a start of radiation irradiation, and the control unit can control the time of the third accumulation operation based on time from an application of a bias voltage to the plurality of pixels until the start of radiation irradiation is detected by the detection unit.

APPENDIX 9

The control unit can control the time of the third accumulation operation to be longer in a case where the time until the start of irradiation is detected is short than in a case where the time until the start of irradiation is detected is long.

APPENDIX 10

The radiation imaging apparatus includes a temperature detection portion configured to monitor ambient temperature around the radiation imaging apparatus, and the control unit can control the time of the third accumulation operation based on the temperature monitored by the temperature detection portion.

APPENDIX 11

The control unit can control the time of the third accumulation operation to be longer in a case where the ambient temperature is high than in a case where the ambient temperature is low.

APPENDIX 12

The control unit can control the time of the third accumulation operation based on a type of the detection portion.

APPENDIX 13

A radiation imaging system includes the radiation imaging apparatus according to any one of appendixes 1 to 12, and an image display unit configured to display the image information output from the radiation imaging apparatus.

APPENDIX 14

A method for controlling a radiation imaging apparatus including a detection portion including a plurality of pixels arranged in a matrix and configured to convert radiation into a charge and output a pixel output value, includes performing first resetting to rest the charge in the plurality of pixels by applying a drive signal in units of row during an accumulation operation of accumulating the charge in the plurality of pixels, first accumulation to accumulate the charge based on the radiated radiation in the plurality of pixels, first reading to output image information corresponding to the radiated radiation from the plurality of pixels, second resetting to reset the charge in the plurality of pixels in units of row by applying a drive signal in units of row during an accumulation operation of accumulating the charge in the plurality of pixels, second accumulation to accumulate charge for use in offset correction of the image information, and second reading to output offset image information, in this order, and time of the second resetting is longer than time of the first resetting.

APPENDIX 15

The first resetting and the second resetting can be performed by an interlaced method in which first and second groups of the plurality of pixels are scanned alternately.

APPENDIX 16

Third accumulation to accumulate the charge in the plurality of pixels can be performed both during a period from a start to end of scanning on the first group and during a period from a start to end of scanning on the second group in the first resetting so that the time of the second resetting becomes longer than the time of the first resetting.

APPENDIX 17

A program for causing a computer to perform the control method according to any one of appendixes 14 to 16.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-117630, filed Jul. 25, 2022, which is hereby incorporated by reference herein in its entirety.

What is claimed is:

1. A radiation imaging apparatus comprising:
    a radiation detector including a plurality of pixels arranged in a matrix and configured to output a signal based on a charge accumulated in the plurality of pixels; and
    one or more controllers being configured to acquire first output information and then acquire second output information being information about the charge accumulated in the plurality of pixels without radiation irradiation on the radiation detector, the first output information being information about the charge accumulated in the plurality of pixels with radiation irradiation on the radiation detector,
    wherein the first output information and the second output information are information for acquiring a corrected radiation image, and
    wherein an output value of a predetermined row that is included in the first output information is an output value of the charge accumulated over a first period, and an output value of the predetermined row that is included in the second output information is an output value of the charge accumulated over a second period, the second period being longer than the first period.

2. The radiation imaging apparatus according to claim 1, wherein acquisition of the first output information and the acquisition of the second output information are performed after a reset operation of resetting the accumulated charge is performed on each row of the radiation detector.

3. The radiation imaging apparatus according to claim 2, wherein the radiation detector includes a pixel row of a first group and a pixel row of a second group arranged alternately, and the reset operation is sequentially performed on the pixel row of the first group at a first periodic timing, whereas the reset operation is sequentially performed on the pixel row of the second group at a second periodic timing.

4. The radiation imaging apparatus according to claim 3, wherein the predetermined row is different from a pixel row on which the reset operation is performed last before a start of the acquisition of the first output information.

5. The radiation imaging apparatus according to claim 4, wherein a pixel row that is of a same group as the pixel row on which the reset operation is performed last, and on which the reset operation is performed at a same synchronization timing as a timing at which the reset operation is performed last is different from the predetermined row.

6. The radiation imaging apparatus according to claim 4, wherein the predetermined row at least includes a next pixel row but one to the pixel row on which the reset operation is performed last.

7. The radiation imaging apparatus according to claim 6, wherein the predetermined row further includes a next pixel row to the pixel row on which the reset operation is performed last, and a period of a difference between the first period and the second period in the next pixel row but one is longer than a period of a difference between the first period and the second period in the next pixel row.

8. The radiation imaging apparatus according to claim 1, wherein a length of the second period is determined based on a length of the first period.

9. The radiation imaging apparatus according to claim 1, further comprising a detection unit configured to detect the radiation,
wherein the controllers determine a length of a period of a difference between the first period and the second period based on a length of a period from an application of a bias voltage to the plurality of pixels until a start of radiation irradiation is detected by the detection unit.

10. The radiation imaging apparatus according to claim 9, wherein the controllers control the length of the period of the difference to be longer in a case where the period until the start of irradiation is detected by the detection unit is long than in a case where the period until the start of irradiation is detected by the detection unit is short.

11. The radiation imaging apparatus according to claim 1, further comprising a temperature detection portion configured to monitor ambient temperature around the radiation imaging apparatus,
wherein the controllers determine a length of a period of a difference between the first period and the second period based on the temperature monitored by the temperature detection portion.

12. The radiation imaging apparatus according to claim 11, wherein the controllers control the length of the period of the difference to be longer in a case where the ambient temperature is high than in a case where the ambient temperature is low.

13. A radiation imaging system comprising:
the radiation imaging apparatus according to claim 1; and
an image display unit configured to display image information output from the radiation imaging apparatus.

14. A method for controlling a radiation imaging apparatus including a radiation detector including a plurality of pixels arranged in a matrix and configured to output a signal based on a charge accumulated in the plurality of pixels, the method comprising:
acquiring first output information and then acquiring second output information being information about the charge accumulated in the plurality of pixels without radiation irradiation on the radiation detector, the first output information being information about the charge accumulated in the plurality of pixels with radiation irradiation on the radiation detector,
wherein the first output information and the second output information are information for acquiring a corrected radiation image, and
wherein an output value of a predetermined row that is included in the first output information is an output value of the charge accumulated over a first period, and an output value of the predetermined row that is included in the second output information is an output value of the charge accumulated over a second period, the second period being longer than the first period.

15. The method according to claim 14, wherein acquisition of the first output information and the acquisition of the second output information are performed after a reset operation of resetting the accumulated charge is performed on each row of the radiation detector.

16. The method according to claim 15, wherein the radiation detector includes a pixel row of a first group and a pixel row of a second group arranged alternately, and the reset operation is sequentially performed on the pixel row of the first group at a first periodic timing, whereas the reset operation is sequentially performed on the pixel row of the second group at a second periodic timing.

17. The method according to claim 16, wherein the predetermined row is different from a pixel row on which the reset operation is performed last before a start of the acquisition of the first output information.

18. The method according to claim 17, wherein a pixel row that is of a same group as the pixel row on which the reset operation is performed last, and on which the reset operation is performed at a same synchronization timing as a timing at which the reset operation is performed last is different from the predetermined row.

19. The method according to claim 17, wherein the predetermined row at least includes a next pixel row but one to the pixel row on which the reset operation is performed last.

20. A non-transitory computer-readable non-volatile storage medium storing a program for causing a computer to perform a method for controlling a radiation imaging apparatus including a radiation detector including a plurality of pixels arranged in a matrix and configured to output a signal based on a charge accumulated in the plurality of pixels, the method comprising:
acquiring first output information and then acquiring second output information being information about the charge accumulated in the plurality of pixels without radiation irradiation on the radiation detector, the first output information being information about the charge accumulated in the plurality of pixels with radiation irradiation on the radiation detector, wherein the first output information and the second output information are information for acquiring a corrected radiation image, and wherein an output value of a predetermined row that is included in the first output information is an output value of the charge accumulated over a first period, and an output value of the predetermined row that is included in the second output information is an output value of the charge accumulated over a second period, the second period being longer than the first period.

* * * * *